United States Patent [19]
Kajiwara et al.

[11] Patent Number: 5,658,525
[45] Date of Patent: Aug. 19, 1997

[54] CELLULOSE FOOD CASING MANUFACTURING METHOD

[75] Inventors: Edward Makoto Kajiwara, Park Ridge; Norman Abbye Portnoy, Clarendon Hills; Paul Edmund Ducharme, Jr., Tinley Park, all of Ill.

[73] Assignee: Viskase Corporation, Chicago, Ill.

[21] Appl. No.: 511,267

[22] Filed: Aug. 4, 1995

[51] Int. Cl.[6] ................................................ B29C 47/88
[52] U.S. Cl. .................. 264/560; 264/561; 264/562; 264/566; 264/569; 264/187; 425/71; 425/72.1; 425/326.1
[58] Field of Search ........................ 264/187, 186, 264/183, 203, 209.1, 565, 559–562, 563, 566, 564, 569, 217, 557–558, 218; 425/326.1, 71, 379.1, 72.1

[56] References Cited

U.S. PATENT DOCUMENTS

| | | | |
|---|---|---|---|
| 1,864,006 | 6/1932 | Weingand | 264/209.1 |
| 2,176,925 | 10/1939 | Reichel et al. | 264/557 |
| 3,061,876 | 11/1962 | Lloyd et al. | 264/569 |
| 3,400,184 | 9/1968 | Matsuo et al. | 264/40.3 |
| 3,887,673 | 6/1975 | Sato et al. | 264/560 |
| 4,246,221 | 1/1981 | McCorsley, III | 264/203 |
| 4,317,794 | 3/1982 | Gord et al. | 264/557 |
| 5,252,284 | 10/1993 | Jurkovic et al. | 264/187 |
| 5,277,857 | 1/1994 | Nicholson et al. | |
| 5,451,364 | 9/1995 | Ducharme, Jr. et al. | 264/559 |

FOREIGN PATENT DOCUMENTS

| | | | |
|---|---|---|---|
| 000648618 | 7/1992 | Australia | 264/186 |
| 000494852 | 7/1992 | European Pat. Off. | 264/186 |
| WO93/19230 | 9/1993 | WIPO | 264/187 |
| WO95/07811 | 3/1995 | WIPO | |

*Primary Examiner*—Jeffery R. Thurlow
*Attorney, Agent, or Firm*—Roger Aceto

[57] ABSTRACT

In a method for forming a cellulose tube suitable for use as a food casing, in which a solution of nonderivatized cellulose, tertiary amine N-oxide and water is extruded through a die gap and the extruded tube is downwardly drawn through an air gap while being internally cooled and then is passed into a water bath, the tube transverse direction tensile strength being increased by drawing the extruded tube through an air length of at least about five inches and exposing the exterior surface of the extruded tube to cooling air in the air gap.

17 Claims, 2 Drawing Sheets

CELLULOSE FOOD CASING MANUFACTURING METHOD

TECHNICAL FIELD

The present invention relates to a method of forming a seamless cellulose tube, suitable for use as a food casing, using a solution of nonderivatized cellulose, tertiary amine N-oxide and water, and more particularly to a method of improving the transverse tensile strength of such cellulose tube.

BACKGROUND OF THE INVENTION

Cellulose food casings are well known in the art and are widely used in the production of stuffed food products such as sausages and the like. These generally are seamless tubes formed of a regenerated cellulose and contain a plasticizer such as water and/or a polyol such as glycerine. Plasticization is necessary because otherwise the cellulose tube is too brittle for handling and commercial use. A non reinforced cellulose for use as a food casing is a tubular film of various sizes having a wall thickness ranging from about 0.025 mm to about 0.076 mm and made in tube diameters of about 14.5 mm to 203.2 mm.

The cellulose for making this casing is most commonly produced by the well known "viscose process". Briefly, in the viscose process a natural cellulose such as wood pulp or cotton linters first is treated with a caustic solution to activate the cellulose to permit derivatization and extract certain alkali soluble fractions from the natural cellulose. The resulting alkali cellulose is shredded, aged and treated with carbon disulfide to form cellulose xanthate. The cellulose xanthate is dissolved in a weak caustic solution. The resulting solution or "viscose" is ripened, filtered, deaerated and extruded.

For food casing, the viscose is extruded as a tube through an annular die and about a self centering mandrel into coagulation and regenerating baths containing salts and sulfuric acid. In the acidic baths the cellulose xanthate, e.g., viscose, is converted back to cellulose. The acid bath decomposes the cellulose xanthate in a chemical reaction with the result that a pure form of cellulose is coagulated and regenerated. Initially, the coagulated and regenerated cellulose is in a gel state. In this gel state the cellulose tube first is run through a series of rinse water dip tanks to remove by-products formed during regeneration. The gel tube then is treated with a glycerine humectant and dried to about 10% moisture based on total casing weight. As noted above, the gel tube is inflated during the drying process to a pressure sufficient to provide a degree of orientation to the dried cellulose tube.

Despite certain well-known problems inherent with the viscose process including the production of noxious products during regeneration of the viscose, it nevertheless remains today as the most commonly used process for the production of cellulose casing for the food processing industry.

An alternate cellulose production method involves forming a cellulose solution by means of a simple dissolution rather than requiring prior derivatization to form a soluble substance (as in the viscose process). U.S. Pat. No. 2,179,181 discloses the dissolution of natural cellulose by a tertiary amine N-oxide to produce solutions of relatively low solids content, for example 7 to 10% by weight cellulose dissolved in 93 to 90% by weight of the tertiary amine N-oxide. U.S. Pat. No. 3,447,939 discloses use of N-methyl-morpholine-N-oxide (NMMO) as the tertiary amine N-oxide solvent wherein the resulting solutions, while having a low solids content, nevertheless can be used in chemical reactions involving the dissolved compound, or to precipitate the cellulose to form a film or filament.

More recent patents such as U.S. Pat. Nos. 4,145,532 and 4,426,288 improve upon the teachings of the '939 Patent. U.S. Pat. No. 4,145,532 discloses a process for making a solution of cellulose in a tertiary amine oxide such as NMMO which contains 10–35% by weight of cellulose. This higher solids content, achieved in part by including an amount of water (from 1.4% to about 29% by weight) in the tertiary amine oxide solvent, provides a solution adapted for shaping into a cellulosic article such as by extrusion or spinning. In U.S. Pat. No. 4,426,288 the NMMO-cellulose solution contains an additive which reduces decomposition of the cellulose polymer chain so that molding or spinning substances are obtained with only slight discoloration and which will yield molded shapes distinguished by improved strengths upon precipitation in a nonsolvent such as water.

Using NMMO as a solvent for cellulose eliminates the need for derivatizing the cellulose, as in the viscose process. Consequently, it eliminates the disadvantages attendant to the viscose process such as the problems associated with the generation of toxic and noxious products such as gases and sulfur compounds during regeneration of the viscose.

Even with these advantages, to applicants' knowledge, NMMO-cellulose solutions heretofore have been used commercially, primarily to manufacture fibers and filaments and not in the commercial manufacture of cellulose food casings. This perhaps is due in part to the fact that the nonderivatized cellulose solution is thermoplastic with a melting point of about 65° C. so it is normally solid at the temperature heretofore used in the extrusion of viscose (e.g. cellulose xanthate) for producing cellulose food casings.

It is speculated that another reason why nonderivatized cellulose has not been commercially used in manufacture of food casings is that the solution at 65° C. has a viscosity significantly higher than the viscosity of the derivatized cellulose heretofore used in the production of cellulose food casings. In particular, nonderivatized cellulose in solution may have a molecular weight of about 80,000 to 150,000 and a viscosity in the range of about 1,000,000 to 3,500,000 centipoises. The high molecular weight and viscosity is because the dissolution of the cellulose does not affect the degree of polymerization. Viscose for casing manufacture (wherein the degree of polymerization is affected by the derivatization process) has a molecular weight in the range of about 95,000 to 115,000 for nonfibrous casing and a viscosity of 5,000 to 30,000 centipoises.

From a cellulose article manufacturing process standpoint these differences are important because after dissolution the process steps (including cellulose recovery) are dependent on whether cellulose has entered into a covalent bond with the solubilizing reagent, i.e., has been derivatized. This is so in the case of the well-known and commercially practiced viscose process. When a cellulose derivative is processed into the shaped article, the derivative such as viscose is first partially coagulated in the extrusion bath and then subsequently hydrolyzed back to cellulose, i.e., cellulose is regenerated. During this hydrolysis and while the derivative is still in a "plastic" state, the reforming cellulose crystallites can be stretched and oriented to give desirable commercial properties such as high tensile strength or burst strength. However, a disadvantage of this general approach is that since a cellulose derivative has been hydrolyzed, additional byproducts are formed. This significantly complicates cellulose recovery.

By contrast in the nonderivative cellulose dissolution methods such as those using an NMMO/H$_2$O solvent solution, orienting the cellulose molecules during the reorganization of the cellulose article is more difficult because there is no covalent bond to break. So reorganization is essentially a physical dilution or decomplexation. However recovery is less complex and, at least in the cellulose/NMMO/H$_2$O system, commercially feasible.

The prior art such as McCorsley III U.S. Pat. No. 4,246,221 and East German Patent No. DD 218 121 has taught that such nonderivatized cellulose containing mixtures with NMMO and water may be forced through a nozzle and longitudinally guided through a 12 inch long air gap into a precipitating bath to form very small diameter solid fibers. More recently the nonderivatized cellulose fiber spinning prior art teaches that such long air path lengths should be avoided. As stated for example in Jurkovic et al U.S. Pat. No. 5,252,284, a long air gap leads to sticking of the fibers, uncertainties in spinning and fiber breakage at high degrees of drawing. According to Jurkovic et al, by using selected orifice diameters and nozzle channel lengths, the air gap is desirably reduced to at most 35 mm (1.4 inches).

It will be appreciated by those skilled in the art that manufacture of individual solid cellulose fibers by extrusion through orifices of 2–4 mils diameter is nonanalogous to manufacture of cellulose food casings which are extruded as a hollow tube of at least about 0.70 inches inside diameter with wall thickness typically on the order of 0.001 to about 0.004 inches.

In U.S. Pat. No. 5,277,857 ("the '857 Patent") there is disclosed a method of and apparatus for manufacturing cellulose food casing from a solution comprising nonderivatized cellulose, NMMO and water. The disclosure of the '857 Patent is incorporated herein by reference.

According to the '857 Patent, it was unexpectedly discovered that nonderivatized cellulose solutions are suitable for use in making cellulose food casings. The nonderivatized cellulose solution comprising cellulose, water and NMMO (hereinafter sometimes referred to as "dope") in a molten state can be extruded as a tubular film into a nonsolvent liquid such as a water bath.

For purposes of this specification "nonderivatized" cellulose means a cellulose which has not been subjected to covalent bonding with a solvent or reagent but which has been dissolved by association with a solvent or reagent through Van der Waals forces such as hydrogen bonding. "Nonsolvent" means a liquid which is not a cellulose solvent.

In the water bath, the NMMO solvent is extracted and the nonderivatized cellulose precipitates. The resulting gel tube can be treated with water, a polyhydric alcohol such as glycerine, or other water soluble softening agents such as a polyalkylene oxide or a polyalkylene glycol prior to drying.

The nonderivatized cellulose food casings prepared by the teachings of the "857 Patent are somewhat limited in the sense that their tensile strength properties are not equivalent to those of commercially employed viscose-derived cellulose casing. More particularly, based on a flat width of about 2.24 inches and wall thickness of about 0.80 mils, the machine direction (MD) tensile strength of the NMMO-based nonderivatized cellulose tube prepared according to the teachings of the '857 Patent is about 3.77 lbs/inch.mil, and the MD tensile strength of a viscose-derived NOJAX type cellulose food casing manufactured and sold by Viskase Corporation is about 4.18 lbs/inch-mil. So from the MD tensile strength standpoint, the two casings are comparable.

However, the transverse direction (TD) tensile strength of the NMMO-based nonderivatized cellulose tube is about 1.60 lbs/inch-mil, whereas a typical food casing made using the viscose process such as a NOJAX® casing made by Viskase Corporation has TD tensile strength of about 3.15 lbs/inch-mil. It will be apparent from the foregoing that the former's TD strength is limiting and further that the NMMO-based nonderivatized tube does not have balanced tensile strengths, i.e., the MD/TD is about 3.76 in contrast to the balanced NOJAX food casing tensile strength where the MD/TD ratio is about 1.33.

An object of this invention is to provide a method of forming a seamless cellulose tube (suitable for use as a food casing) from a solution comprising nonderivatized cellulose, tertiary amine N-oxide and water.

Another object is to provide such a method including extruding such a solution through an air gap and into a water bath so as to yield a cellulose tube with an improved TD tensile strength.

A further object is to provide such a method wherein improved tensile strength is gained by cooling the extruded solution in the air gap.

SUMMARY OF THE INVENTION

In particular, this invention relates to an improvement to a method of forming a seamless cellulose tube of nonderivatized cellulose suitable for use as a food casing, wherein a solution comprising nonderivatized cellulose, tertiary amine N-oxide and water at temperatures below about 235° F. is downwardly extruded through a die gap at a flow output of at least about 20 lbs/hr and at least about two lbs/hr cellulose (bone dry basis) to form an extruded tube. The latter is longitudinally passed through an air gap and internally cooled by a refrigerant in said air gap. The extruded tube then is passed through a water bath and emerges from the water bath as a wet tube which is inflated, longitudinally and transversely expanded and dried in the expanded state to form the cellulose tube of film thickness. As disclosed in copending application Ser. No. 08/179,418 now U.S. Pat. No. 5,451,364, an improvement in the TD tensile strength of such an extruded tube can be attained by passing it through an air gap of at least six inches.

The particular improvement of this invention to the long air gap method comprises drawing the extruded tube through an air gap of at least about five inches in length. In addition, it has been found that further unexpected significant improvements in the TD tensile strength of the extruded tube can be achieved by holding the temperature of the water bath in the range of between about 35° and 65° F., exposing the extruded tube to cool air in the air gap and drawing the tube through the air gap at a draw ratio of four or more. Under these conditions it was found that TD tensile strength could be improved by 0.20 lbs/in$^2$ or more over similar extrusion conditions but without the cooling air in the air gap.

Other objects and advantages of this invention will be apparent from the ensuing detailed disclosure and appended claims.

DETAILED DESCRIPTION OF THE INVENTION

In all of the tests described herein, the starting material was a "dope" in the form of a yellow/brown solid having a melting point of 60°–70° C., obtained from Courtaulds Research Ltd. Coventry, England. The Material Safety Data Sheet for the dope identifies it as containing, by weight, 70–80% NMMO, 10–20% cellulose and 5–15% water. It is believed the dope as supplied is made according to processes described in U.S. Pat. Nos. 4,145,532; 4,196,282 and 4,255,300 the disclosures of which are incorporated herein by reference. The dope, received as slabs, was ground to a particle size of less than about 1.58 mm, i.e., ⅛ inch, in diameter.

Figure 1:
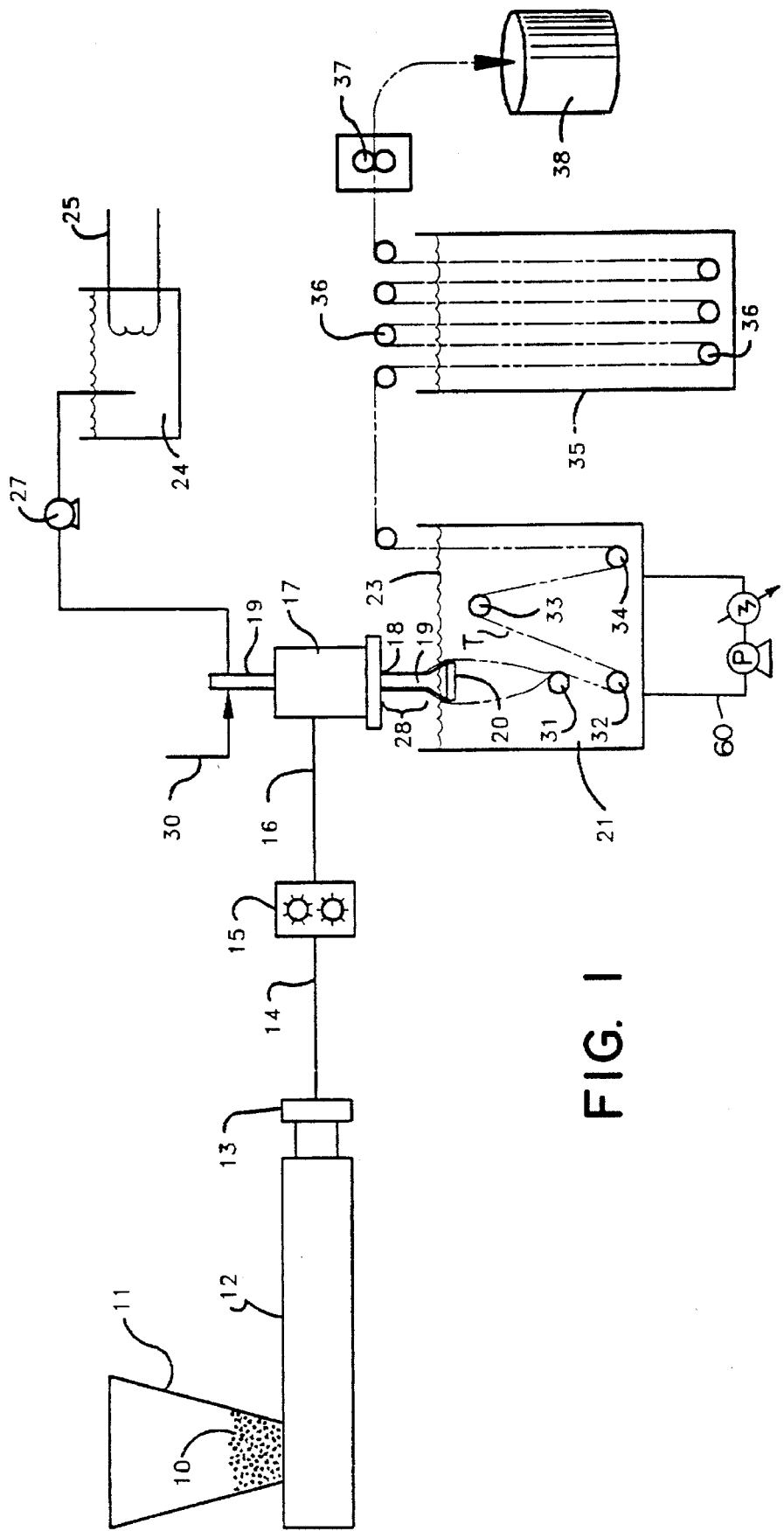
FIG. 1 is a schematic flow sheet showing an arrangement to manufacture the NMMO cellulose food casing.

Referring to the drawings, FIG. 1 shows the apparatus as may be used in the method of the present invention. This apparatus is more particularly described in U.S. Pat. No. 5,451,364 filed Jan. 10, 1994, the disclosure of which is incorporated herein by reference. It is sufficient for purposes of the present invention to say that the apparatus includes an extruder 12 having a screen pack section 13. A heated pump 15 down stream of the extruder is connected to an extrusion die 17 arranged for downward extrusion. The extrusion die has an annular orifice 18 disposed above the level 23 of a nonsolvent liquid bath 21. An elongated mandrel 19 depends from the extrusion die such that the lower end 20 of the mandrel is disposed below the liquid level 23. Various mandrel forms as disclosed in U.S. Pat. No. 5,451,364 may be used. A preferred mandrel is one which allows the air gap 28 between orifice 18 and the liquid level 23 to be about 5 inches to about 12 inches long. Moreover, a blade-like structure (not shown) depending from the lower end of the mandrel helps to flatten the tubular extrusion T so it can be transported through the system.

Air can be introduced into the mandrel 19 through a line 30 in order to facilitate start-up for the initial drawing of an extruded tube along the mandrel and over its lower end 20. Likewise, an internal bath of nonsolvent liquid is introduced through the mandrel and into the extruded tube. The internal bath is introduced from a supply container 24 and preferably this internal bath is cooled to between about 35° F. and 65° F.

A second bath 35 sits adjacent the first bath 21 and suitable rollers 31–34 and 36 are provided to permit passage of an extruded tube in a flattened condition through and between each bath. The relative speed of the rollers also can be controlled to draw the tubular extrusion through the air gap.

Briefly, in operation, ground dope particles 10 are fed through funnel 11 to extruder 12 which heats the dope to a temperature in the range of from about 200° F. to about 240° F.

The extruded dope is flowed through screen pack section 13 to remove any particulate matter from the molten dope stream.

The fully molten dope is flowed through an electrically heated conduit 14 to heated melt pump 15. The molten dope discharged from melt pump 15 flows through conduit 16 to die assembly 17. The molten dope is downwardly extruded through die assembly 17 and is discharged from annular orifice 18 to form a seamless tube T.

The extruded tube T moves downwardly and passes along the outer surface of mandrel 19, over the enlarged lower end 20, and into first bath 21 of a nonsolvent liquid, for example, water.

The extruded tube T preferably is drawn from the extrusion orifice and through the air gap in part by the action of rolls 31–34 at a rate which allows elongation and thinning of the tube wall. A preferred draw rate for purposes of the present invention is greater than four and a most preferred rate is in the range of five to eight. This drawing action not only thins the extruded wall structure but also provides some degree of MD orientation to the cellulose in the extruded tube. The extruded tube T leaving the second bath 35 passes through a drier (not shown) to produce a cellulose tube 38.

One function of first bath 21 comprising nonsolvent liquid is to harden the extruded tube T by densifying and regenerating the cellulose. The bath also draws out NMMO from immersed tube T so that a tube leaving the first bath comprises essentially pure cellulose. It has been experimentally determined that the presence of limited concentrations of NMMO in first bath 21 improves the tensile strength properties of tube T, although concentrations above 50 wt. % adversely affect these properties. For purposes of controlling the temperature of the first bath, a suitable recirculation system 60 may be provided for heating or cooling the first bath.

For details of the structure of the die assembly 17 and mandrel 19, reference is made to U.S. Pat. No. 5,451,364. Further, as disclosed in said application, the air gap length 28 between the extrusion orifice 18 and the liquid level 23 of the first bath 21 was found to be important for the development of TD tensile strength.

In the course of extruding tube T, the internal bath nonsolvent liquid introduced through the mandrel and then out through an opening in the mandrel (not shown) flows down the mandrel surface and eventually contacts the inner surface of the extruded tube T in the course of their concurrent flow. In this manner, the nonderivatized cellulose is cooled and precipitated at the tube inner surface from the extruded dope. That is, the internal bath coagulates the extruded tube T from the inside, since the internal bath composition is relatively low in solvent content (compared to the tube itself). However, the internal bath also lubricates the mandrel outer surface and prevents the downwardly moving tube solution from adhering to the mandrel, so it preferably contains 30–50% NMMO (by weight). This lubricating flow facilitates passage of the extruded tube T over the mandrel 19 and in particular its enlarged lower end section 20. The internal bath also prevents the tube solution film from blocking to itself. Since the first bath liquid level 23 is maintained above the lower end of the enlarged section 20 of the mandrel but does not immerse the entire length of this section, the internal bath is concentrically discharged from the space between the cellulose tube inner surface and the mandrel outer surface. Instead of mixing with the first bath, the internal bath may, for example, be upwardly withdrawn through another passage (not illustrated) in the mandrel and the connecting die to the outer end thereof for recovery of NMMO by separation from water (not illustrated).

Although the internal bath is the preferred method of internally cooling the extruded solution tube in the air path length, this internal bath could also be supplemented by other cooling means as for example a closed circuit refrigeration system positioned between the mandrel outer surface and the tube inner wall.

Returning now to operation of the die-mandrel assembly, gas such as air is used during start-up to inflate the extruded solution tube as it drops from annular orifice 18 and passes over the mandrel 19. This is accomplished by introducing slightly pressurized air through a conduit (not shown) which opens through mandrel 19 into the interior of the extruded tube. This air increases the tube diameter and counteracts the natural neck-in tendency of the tube. Only short bursts of air are required and the air pressure is typically less than 2 inches water. Occasionally air is introduced during the extrusion operation to slightly increase the extruded tube diameter and/or lower the level of the internal bath that has developed above the enlarged lower end 20 of the mandrel.

Copending application Ser. No. 08/179,418 shows that benefits in the MD tensile strength are derived by increasing the length of the air gap to a length greater than six inches. One possible explanation for this is the cooling of the extruded tube that is engendered as it passes through the air gap. In this respect, it is generally known that the extruded film must be cooled and hardened to some extent so it can be drawn prior to entering the nonsolvent bath. It is for this reason that the cellulose-NMMO solution is extruded through an air gap and into the nonsolvent. The residence time in the air gap allows for such cooling and drawing. It has been proposed, in connection with fiber extrusion, to augment the ambient cooling in the air gap by blowing air at the extruded fiber. A more recent publication WO 95/07811 suggests the use of a cooling line in connection with tubular extrusions wherein the cooling line is disposed around the extruded tube in such a way as to direct an air stream at a right angle to the extrusion direction, that is, perpendicular to the outer surface of the extruded tube.

In connection with the long air gap method as disclosed herein and in U.S. Pat. No. 5,451,364, further tests were performed to determine whether directing a stream of cooling air at the tube would further improve the transverse direction tensile properties. In these tests an annular manifold was set up in the air gap such that the extruded tube passed through the manifold.

Eight test runs were made in which the air gap length, first bath temperature, die gap and draw ratio were varied. Each run was done twice, once with cooling air on and once with no cooling air. The transverse tensile strength of films produced were tested for transverse direction (TD) tensile strength.

As used herein, all cellulose tensile strengths, unless otherwise noted, are measured "wet" which is usually a more stringent test than "dry" tensile strength. For this measurement, the tube sample is first immersed in tap water at room temperature for 20 minutes before the tensile strength measurement. The test is performed on an Instron Table Model Tensile Testing Machine (or equivalent) of the constant rate-of-jaw separation type using a method derived from ASTM D-882. The specific procedure is as follows:

1.) Cut six samples 2 inches long machine direction (MD)×1 inch long tensile direction (TD), and identify as MD.

2.) Cut six samples 1 inch long MD×greater than 1 inch long TD, and identify as TD.

3.) Measure thickness of samples with a micrometer having a range up to 0.1 inch and accuracy of 0.001 inch, basing measurement on minimum thickness (the weakest point).

4.) Soak samples in room temperature water for 20 minutes if wet properties are desired. Skip this step if dry properties are being obtained.

5.) Measure flat width of wet samples as well as their thickness in the same manners as 3.).

6.) Set the Testing Machine crosshead speed and the chart speed at 20 inches/minute.

7.) Set the gauge length at 1 inch and zero the pen.

8.) Calibrate the Testing Machine to a full scale load of 25 lbs.

9.) Clamp the specimen squarely between the jaws.

10.) Run the crosshead down until the specimen ruptures.

11.) Calculate the specimen tensile strength in lbs/inch-mil thickness in accordance with the following formula:

$$\text{tensile strength} = \frac{\text{Force (lbs.)}}{\text{width (in.)} \times \text{thickness (mils)}}$$

12.) Calculate the arithmetic average of six tensile strength readings for MD and the six readings for TD. After TD tensile strength measurements were taken, the test results were compared to determine what effect, if any, the air cooling had on the TD tensile properties. These parameters and test results were modeled by means of computer simulation in order to provide additional data.

Figure 2:
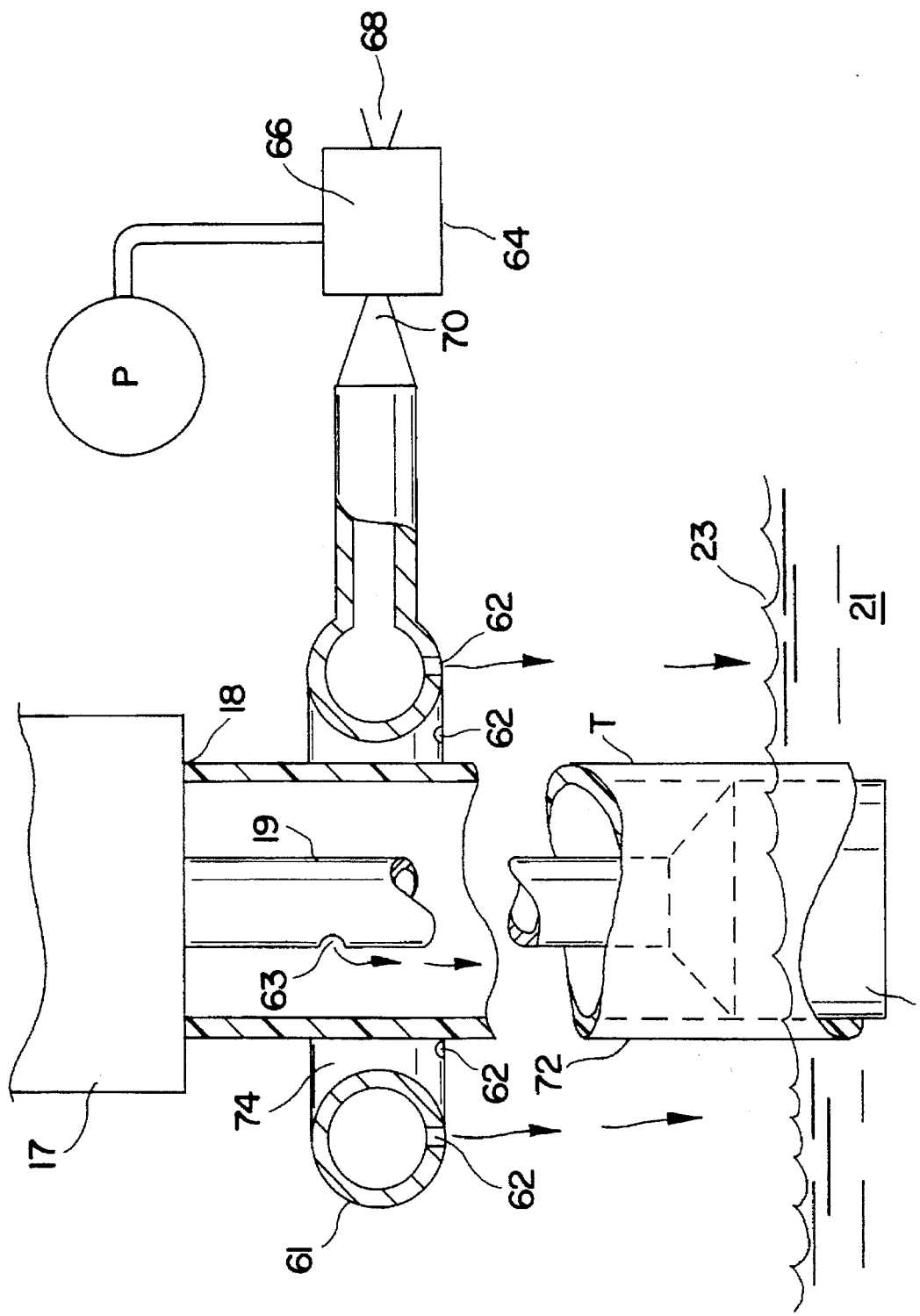
FIG. 2 is an enlarged elevation view partly broken away and in section of the extruder-mandrel-first bath portion of the FIG. 1 system, showing the air cooling ring in place about the extruded tube in the area of the air gap.

FIG. 2 shows the test arrangement, in schematic fashion, for obtaining the actual data. This arrangement includes the extrusion die 17 with its depending mandrel 19 constructed and arranged as noted hereinabove. Outlet 63 in the mandrel allows the introduction of the internal bath through the mandrel and into the extruded tube. The die is arranged above the liquid level 23 of nonsolvent bath 21 and the tube "T" is extruded and drawn downwardly through the resulting air gap, over the enlarged lower end 20 of the mandrel and into the nonsolvent bath.

Disposed about the extruded tube is an annular manifold or air ring 61. The air ring is made of tubular stock about 0.325 inches in diameter which is bent to form a ring having an internal diameter at about four inches. Drilled around the underside of this ring are a series of openings 62 about 0.062 inches in diameter.

The air ring is connected to a vortex tube refrigerated air unit 64. The vortex tube is an instrument sold by Vortec Corporation and is capable of converting compressed air into two air streams, one hot and one cold. The vortex tube 64 is connected to a source of pressurized air P. Compressed air is injected through nozzles (not shown) and into chamber 66 of the Vortex tube. The chamber and nozzles are arranged so as to create a vortex which moves toward a first outlet 68.

A control valve (not shown) at the first outlet forces a portion of the air flow back to a second outlet 70. In the process, air exiting from first outlet 68 is heated and air exiting from second outlet 70 is significantly cooled. This cooled air flow is conducted to air ring 61 and is discharged downwardly through the air ring openings 62.

FIG. 2 shows that openings 62 are arranged to direct the air flow downwardly and generally parallel with the outer surface 72 of the extruded tube T. The effect is to produce an annular air curtain which is radially spaced from tube outer surface 72 and parallel to it. It was found during testing that directing air flow at a right angle against the outer surface of the extruded tube passing through the long air gap initiated an undesirable vibration of the extruded tube. This vibration resulted in diametrical changes of the extruded tube so that it was difficult to maintain size uniformity. However, directing the cooling air flow downwardly and generally parallel to the surface of the extruded tube was found to avoid the generation of such vibrations.

As cooling air flows downwardly from openings 62, additional air at room temperature is drawn into the annulus 74 of the air ring and into contact with the surface of the extruded tube.

For purposes of the test, the target extrusion rate was about 160 gm of dope per minute or about 21 lbs/hr. The composition of the dope was such that about 2 lbs/hr of cellulose was being extruded. Each of two die gap settings, 40 mil and 50 mil, were used for the opening of orifice 18. The extruded tube T was about 1.25 inches in diameter which made the width of annulus 74 less than 1.5 inches. Two draw rates of 4 and 6 also were used to pull the extruded tube through the air gap. The target air gap lengths for the tests were six inches and nine inches. However, the actual air gap length varied from target. Moreover, the length of the air gap as measured outside of the extruded tube differed slightly from the length of the air gap inside the extruded tube. Accordingly, the air gap length as reported in Table I represent an average of the internal and external air gap lengths.

The target water bath temperatures were about 45° F. and about 65° F. While the actual temperature varied slightly from the target values, the variance was not thought to result in significant changes of TD tensile strength. Also, the first water bath is expected to accumulate NMMO over time but this was not considered as significant for purposes of the present invention. The internal bath introduced through outlet 63 was about 30% NMMO and was at room temperature.

For purposes of supplying cooling air, the vortex tube 64 is connected to a source of air at a pressure of about 80 psi. This produces an air flow from the air ring at a temperature of about 40° F.

The test parameters are noted in Table I. Table I also reports the results of the TD tensile tests conducted on the film in terms of the difference between the tensile strength with the air flow "on" and with the air flow "off". For this reason the tensile strength is reported in terms of ATD.

TABLE I

ΔTD WITH COOL AIR FLOW

| SAMPLE | | AIR ON | AIR OFF | AIR GAP | DRAW RATIO | 1ST BATH TEMP °F. | ΔTD PSI |
|---|---|---|---|---|---|---|---|
| 1 | A | X | | 10.8 | 6 | 45 | +0.57 |
|   | B |   | X | 10.7 | 6 | 47 |  |
| 2 | A | X | | 7.1 | 6 | 51 | +0.35 |
|   | B |   | X | 7.1 | 6 | 45 |  |
| 3 | A | X | | 7.1 | 4 | 47 | −0.4 |
|   | B |   | X | 7.1 | 4 | 45 |  |
| 4 | A | X | | 9.9 | 4 | 46 | +0.13 |
|   | B |   | X | 10.1 | 4 | 43 |  |
| 5 | A | X | | 6.9 | 6 | 65 | −0.09 |
|   | B |   | X | 6.9 | 6 | 66 |  |
| 6 | A | X | | 10.1 | 6 | 66 | −0.68 |
|   | B |   | X | 10.5 | 6 | 63 |  |
| 7 | A | X | | 6.9 | 4 | 65 | −0.06 |
|   | B |   |   | 6.9 | 4 | 66 |  |
| 8 | A | X | | 10.4 | 4 | 68 | +0.06 |
|   | B |   | X | 10.4 | 4 | 67 |  |

The results as shown in Table I give some indication that a cooling air flow does not provide a universal beneficial effect on TD tensile strength. For example, the results of tests 3,5,6 and 7 show that in fact, under the certain test conditions, the use of a cooling air flow resulted in a decrease of the TD tensile strength. On the other hand, the results of tests 1,2,4, and 8 indicated that there was some range of the air gap length, first bath temperature and draw ratio parameters which did result in a TD tensile strength improvement.

The actual data provided an experimental matrix for analysis based on a three factor, two level design involving eight experiments with three variables w, x and y and the levels were "+" (high) and "−" (low) as shown in the following table.

| Experiment No. | w | x | y |
|---|---|---|---|
| 1 | + | + | + |
| 2 | − | + | + |
| 3 | + | − | + |
| 4 | − | − | + |
| 5 | + | + | − |
| 6 | − | + | − |
| 7 | + | − | − |
| 8 | − | − | − |

This matrix of eight actual experimental results done both with the air "on" and air "off" produced a total of sixteen experiments as reported in Table I. The actual difference in TD tensile strength (ΔTD) obtained between the air "on" run and its identical air "off" run was modeled as the dependent variable using a general linear model program written with SAS software.

This produced an equation for the ΔTD as modeled from the real experimental data which tied together the factors of first bath temperature (w) length of air gap (x) and draw ratio (y) and which was:

$$\Delta TD = 14.34 + 0.186w + 0.988x + 2084y - 0.0098wx - 0.0239wy - 0.084xy.$$

The correlation coefficient of the equation was 0.99. This equation, derived from actual data, was used to calculate the results of hypothetical experimental conditions that held all variables constant except for the variables of interest.

The parameters of the simulated tests were first bath temperature of 35° F. to 70° F. in 5° increments; air gap length in one inch increments from 5 to 10 inches and a draw ratio in units from 4 to 8. This produced 240 simulated sets of measurements for ΔTD tensile strength, most of which are shown in Table II. The omitted sets of data are from simulated runs which serve only to confirm the ΔTD trend shown in Table II. For example, in omitted run No. 6, a first bath of 35° F., an air gap of 6 inches and draw ratio of 4 produced a ΔTD of −0.99.

TABLE II

| RUN | 1ST BATH TEMPERATURE | AIR GAP | DRAW RATIO | ΔTD PSI |
|---|---|---|---|---|
| 1 | 35 | 5 | 4 | −1.30 |
| 2 | 35 | 5 | 5 | −0.47 |
| 3 | 35 | 5 | 6 | 0.36 |
| 4 | 45 | 5 | 7 | 1.18 |
| 5 | 35 | 5 | 8 | 2.01 |
| 7 | 35 | 6 | 5 | −0.25 |
| 8 | 35 | 6 | 6 | −0.50 |
| 9 | 35 | 6 | 7 | 1.24 |
| 10 | 35 | 6 | 8 | 1.98 |
| 12 | 35 | 7 | 5 | −0.02 |
| 13 | 35 | 7 | 6 | 0.64 |
| 14 | 35 | 7 | 7 | 1.30 |
| 15 | 35 | 7 | 8 | 1.96 |
| 17 | 35 | 8 | 5 | 0.20 |
| 20 | 35 | 8 | 8 | 1.93 |
| 21 | 35 | 9 | 4 | −0.06 |
| 22 | 35 | 9 | 5 | 0.43 |
| 25 | 35 | 9 | 8 | 1.90 |
| 26 | 35 | 10 | 4 | 0.25 |
| 27 | 35 | 10 | 5 | 0.65 |
| 30 | 35 | 10 | 8 | 1.87 |
| 32 | 40 | 5 | 5 | −0.38 |
| 33 | 40 | 5 | 6 | 0.32 |

TABLE II-continued

| RUN | 1ST BATH TEMPERATURE | AIR GAP | DRAW RATIO | ΔTD PSI |
|---|---|---|---|---|
| 35 | 40 | 5 | 8 | 1.74 |
| 37 | 40 | 6 | 5 | -0.21 |
| 38 | 40 | 6 | 6 | 0.42 |
| 40 | 40 | 6 | 8 | 1.66 |
| 42 | 40 | 7 | 5 | -0.31 |
| 43 | 40 | 7 | 6 | 0.51 |
| 45 | 40 | 7 | 8 | 1.59 |
| 46 | 40 | 8 | 4 | -0.31 |
| 47 | 40 | 8 | 5 | 0.14 |
| 48 | 40 | 8 | 6 | 0.60 |
| 50 | 40 | 8 | 8 | 1.51 |
| 52 | 40 | 9 | 5 | 0.32 |
| 55 | 40 | 9 | 8 | 1.44 |
| 56 | 40 | 10 | 4 | 0.21 |
| 57 | 40 | 10 | 5 | 0.50 |
| 60 | 40 | 10 | 8 | 1.36 |
| 62 | 45 | 5 | 5 | -0.30 |
| 63 | 45 | 5 | 6 | 0.29 |
| 65 | 45 | 5 | 8 | 1.47 |
| 67 | 45 | 6 | 5 | -0.17 |
| 68 | 45 | 6 | 6 | 0.34 |
| 70 | 45 | 6 | 8 | 1.34 |
| 72 | 45 | 7 | 5 | -0.04 |
| 73 | 45 | 7 | 6 | 0.38 |
| 75 | 45 | 7 | 8 | 1.22 |
| 76 | 45 | 8 | 4 | -0.25 |
| 77 | 45 | 8 | 5 | 0.09 |
| 78 | 45 | 8 | 6 | 0.42 |
| 80 | 45 | 8 | 8 | 1.09 |
| 81 | 45 | 9 | 4 | -0.04 |
| 82 | 45 | 9 | 5 | 0.21 |
| 83 | 45 | 9 | 6 | 0.46 |
| 85 | 45 | 9 | 8 | 0.97 |
| 86 | 45 | 10 | 4 | 0.17 |
| 87 | 45 | 10 | 5 | 0.34 |
| 90 | 45 | 10 | 8 | 0.84 |
| 92 | 50 | 5 | 5 | -0.21 |
| 93 | 50 | 5 | 6 | 0.26 |
| 95 | 50 | 5 | 8 | 1.20 |
| 97 | 50 | 6 | 5 | -0.13 |
| 98 | 50 | 6 | 6 | 0.26 |
| 100 | 50 | 6 | 8 | 1.02 |
| 102 | 50 | 7 | 5 | -0.05 |
| 103 | 50 | 7 | 6 | 0.25 |
| 105 | 50 | 7 | 8 | 0.85 |
| 106 | 50 | 8 | 4 | -0.19 |
| 107 | 50 | 8 | 5 | 0.03 |
| 110 | 50 | 8 | 8 | 0.68 |
| 111 | 50 | 9 | 4 | -0.03 |
| 112 | 50 | 9 | 5 | 0.10 |
| 115 | 50 | 9 | 8 | 0.50 |
| 116 | 50 | 10 | 4 | 0.13 |
| 120 | 50 | 10 | 8 | 0.33 |
| 122 | 55 | 5 | 5 | -0.12 |
| 123 | 55 | 5 | 6 | 0.23 |
| 125 | 55 | 5 | 8 | 0.93 |
| 127 | 55 | 6 | 5 | -0.09 |
| 128 | 55 | 6 | 6 | 0.17 |
| 130 | 55 | 6 | 8 | 0.70 |
| 132 | 55 | 7 | 5 | -0.06 |
| 133 | 55 | 7 | 6 | 0.12 |
| 135 | 55 | 7 | 8 | 0.48 |
| 137 | 55 | 8 | 5 | -0.03 |
| 138 | 55 | 8 | 6 | 0.06 |
| 140 | 55 | 8 | 8 | 0.26 |
| 141 | 55 | 9 | 4 | -0.02 |
| 142 | 55 | 9 | 5 | -0.00 |
| 143 | 55 | 9 | 6 | 0.01 |
| 145 | 55 | 9 | 8 | 0.04 |
| 146 | 55 | 10 | 4 | 0.10 |
| 147 | 55 | 10 | 5 | 0.02 |
| 148 | 55 | 10 | 6 | -0.05 |
| 149 | 55 | 10 | 7 | -0.12 |
| 150 | 55 | 10 | 8 | -0.19 |
| 152 | 60 | 5 | 5 | -0.03 |
| 153 | 60 | 5 | 6 | 0.20 |
| 155 | 60 | 5 | 8 | 0.66 |
| 157 | 60 | 6 | 5 | -0.52 |
| 158 | 60 | 6 | 6 | 0.09 |
| 160 | 60 | 6 | 8 | 0.39 |
| 162 | 60 | 7 | 5 | -0.07 |
| 163 | 60 | 7 | 6 | -0.01 |
| 164 | 60 | 7 | 7 | 0.05 |
| 165 | 60 | 7 | 8 | 0.11 |
| 168 | 60 | 8 | 6 | -0.11 |
| 169 | 60 | 8 | 7 | -0.14 |
| 170 | 60 | 8 | 8 | -0.16 |
| 173 | 60 | 9 | 6 | -0.22 |
| 174 | 60 | 9 | 7 | -0.32 |
| 175 | 60 | 9 | 8 | -0.43 |
| 176 | 60 | 10 | 4 | 0.06 |
| 177 | 60 | 10 | 5 | -0.13 |
| 178 | 60 | 10 | 6 | -0.32 |
| 180 | 60 | 10 | 8 | -0.70 |
| 181 | 65 | 5 | 4 | -0.05 |
| 182 | 65 | 5 | 5 | 0.06 |
| 183 | 65 | 5 | 6 | 0.16 |
| 185 | 65 | 5 | 8 | 0.39 |
| 187 | 65 | 6 | 5 | -0.01 |
| 188 | 65 | 6 | 6 | 0.01 |
| 190 | 65 | 6 | 8 | 0.07 |
| 191 | 65 | 7 | 4 | -0.02 |
| 194 | 65 | 7 | 7 | -0.20 |
| 195 | 65 | 7 | 8 | -0.26 |
| 196 | 65 | 8 | 4 | -0.01 |
| 199 | 65 | 8 | 7 | -0.43 |
| 200 | 65 | 8 | 8 | -0.58 |
| 201 | 65 | 9 | 4 | 0.01 |
| 205 | 65 | 9 | 8 | -0.90 |
| 206 | 65 | 10 | 4 | 0.20 |
| 207 | 65 | 10 | 5 | -0.29 |
| 208 | 65 | 10 | 6 | -0.60 |
| 210 | 65 | 10 | 8 | -1.22 |
| 211 | 70 | 5 | 4 | 0.15 |
| 213 | 70 | 5 | 6 | 0.13 |
| 215 | 70 | 5 | 8 | 0.12 |
| 216 | 70 | 6 | 4 | 0.12 |
| 217 | 70 | 6 | 5 | 0.03 |
| 218 | 70 | 6 | 6 | -0.07 |
| 220 | 70 | 6 | 8 | -0.25 |
| 221 | 70 | 7 | 4 | 0.08 |
| 222 | 70 | 7 | 5 | -0.09 |
| 225 | 70 | 7 | 8 | -0.62 |
| 226 | 70 | 8 | 4 | 0.05 |
| 227 | 70 | 8 | 5 | -0.21 |
| 230 | 70 | 8 | 8 | -0.99 |
| 231 | 70 | 9 | 4 | 0.02 |
| 232 | 70 | 9 | 5 | -0.33 |
| 236 | 70 | 10 | 4 | -0.02 |
| 240 | 70 | 10 | 8 | -1.73 |

As with the actual experiments, the results of these computer simulated experiments indicated there would be a decrease in tensile strength when cooling air flow was used in association with certain values of first bath temperature, air gap length and draw ratio. Other simulations indicated a marginal increase in TD tensile strength in other ranges of these parameters.

It was determined that as the first bath temperature increased, there was a decrease in the instances where cooling air flow provided a TD tensile strength improvement. For example, at a first bath temperature above 65° F., the air flow had only a marginal positive effect (actually less than about 0.2 lb/in$^2$) and predominately a negative effect on the TD tensile strength throughout an air gap range of 5–10 inches and a draw ratio in the range of 4–8. For this reason it was determined that 65° F. was the upper limit of first bath temperature when attempting to use a cooling air flow to increase TD tensile strength.

It also was found that in general, as the air gap length and draw ratio increased, the beneficial effects of cooling air flow increased. However, throughout the temperature range of 35°–65° F. a positive increase in TD tensile strength using cooling air flow was not seen at a draw ratio of below 5 until the air gap increased to 10 inches. Even at 10 inches, the TD tensile strength increase at a draw ratio of 4 did not exceed about 0.24 lb/in$^2$ and this was only at the coldest first bath temperature of 35° F. For this reason it was determined that for a first bath temperature above 35° F., a draw ratio of 5 was about the lower limit required to obtain an increase in TD tensile strength using cooling air flow in the air gap.

From U.S. Pat. No. 5,451,364 filed Jan. 10, 1994, it is known that increasing the air gap length will improve TD tensile strength. This also was shown in the present case in that with first bath temperature held constant, use of cooling air flow had the effect of increasing the TD tensile strength as the air gap length increased. This was not the case, however, at a first bath temperature of 70° wherein the ΔTD tensile strength using cooling air flow decreased as the air gap increased. Results of the 240 simulations were then screened to list only those ranges of first bath temperature, air gap length and draw ratio which provided a meaningful increase in TD tensile strength equal to or greater than about 0.2 lb/in$^2$.

With a first bath temperature in the range of 35°–40° the simulated tests showed that a ΔTD>0.20 lb/in$^2$ could be achieved with an air gap in the range of 5–10 inches and a draw ratio of 4 or greater. At a 65° F. to 50° F. first bath temperature an increase of the draw ratio to a minimal 5 and 6 respectively was required to provide this ΔTD increase. At higher temperatures of 55°–65° F. this increase could be achieved only with an air gap of at least 5 inches at a draw ratio of at least 6.

The data further showed that the benefit of cooling air flow was obtained primarily with a first bath temperature in the range of 35°–45° F. In this temperature range, a number of combinations of air gap length and draw ratios in the range of tested values produced an increase in TD tensile strength greater than 0.2 lbs/in$^2$. Of the 90 separate tests in this range, 63 or 70% produced the required amounts increase in TD tensile strength. Of the next 60 tests conducted in the 50°–55° range, only 26 or 43% of the combination of air gap and draw ratios produced a ΔTD greater than 0.2 lb/in$^2$. Of the 90 simulated tests in the 60°–70° F. range, only 6 or 6.7% of the combinations (and none at 70° F.) would produce this margin of increase.

Accordingly, the surprising result of these tests, both actual and simulated when using the long air gap method as disclosed in copending application Ser. No. 08/179,418, is that cooling air flow is more likely to produce a positive increase in TD tensile strength if the first bath temperature is in the range of about 35° F. to about 55° F. and more preferably in the range of about 35° F. to about 45° F.

It should be noted that in the tests the first bath was water so that 35° F. was taken on the lower limit for the first bath temperature. However, as a practical matter the first bath will contain a concentration of NMMO that is washed from the extruded tube. This may permit cooler first bath temperatures. Also, it should be appreciated that cool air can be obtained from other sources such as by passing an air stream through a cooled heat exchanger.

Draw ratio also is important in that if the first bath temperature and air gap length remains constant, the data shows that the beneficial effect of cooling air flow increases as the draw ratio increases.

Thus, it should be appreciated that the present invention of maintaining the first bath temperature below about 65° F. while exposing the extruded tube in the air gap to a cooling air flow provides a method for improving the TD tensile strength of a tubular cellulose film formed by extrusion from a solution of NMMO, cellulose and water.

Having described the invention in detail, what is claimed as new is:

1. A method of enhancing the transverse direction tensile strength of a seamless cellulose tubular film suitable for use as a sausage casing of a type which is formed by downwardly extruding a thermoplastic solution of nonderivatized cellulose, N-oxide cellulose solvent and water from an annular die to form an extruded tube which passes through an air gap and into a water bath where the N-oxide solvent is removed from the extruded tube thereby regenerating the cellulose and forming a wet solvent-free cellulose tube and thereafter inflating and drying the wet solvent-free cellulose tube to form said seamless cellulose tubular film, said method of enhancing the transverse direction tensile strength of said seamless tubular cellulose film comprising the steps of:

a) extruding said thermoplastic solution at a temperature below about 240° F. and at a flow rate of at least 20 lb/hr and at least 2 lb/hr of cellulose on a bone dry basis to form said extruded tube;

b) maintaining the temperature of said water bath below about 65° F.;

c) drawing said extruded tube through the air gap and into the water bath at a draw ratio of at least 4, the air gap as measured between the annular die and the water bath being at least 5 inches; and d) exposing said extruded tube in the air gap to a flow of cooling air for cooling the extruded tube in the air gap and prior to its entering the water bath whereby the cooling of the extruded tube in the air gap together with maintaining the bath temperature below about 65° F. enhances the transverse direction tensile strength of the seamless tubular film as compared to a seamless tubular film formed without exposing the extruded tube to a cooling air flow as set out in step (d).

2. A method as in claim 1 wherein said air gap is between about 5 and 10 inches, said first bath temperature is between about 35° F. and about 55° F. and said draw ratio is between about 5 and about 8.

3. A method as in claim 2 wherein said first bath temperature is about 35° F. to about 45° F.

4. A method as in claim 1, wherein exposing said extruded tube in said air gap to a flow of cooling air is accomplished by directing a stream of cooling air generally parallel to the outer surface of said extruded tube.

5. A method as in claim 4 wherein said stream of cooling air forms a downwardly flowing air curtain extending around and radially spaced from the outer surface of said extruded tube.

6. A method as in claim 4 wherein said flow of cooling air is derived from a vortex tube connected to a source of pressurized air.

7. A method for forming a seamless cellulose tubular film of nonderivatized cellulose suitable for use as a food casing having an enhanced transverse direction tensile strength comprising the steps of:

a) downwardly extruding from an annular die orifice a solution composed of nonderivatized cellulose, a tertiary amine N-oxide cellulose solvent and water, the solution being extruded in the form of a tube;

b) drawing said extruded tube from said die orifice through an air gap at a draw ratio of at least 4 and into a water bath, the length of said air gap as measured between said die orifice and the surface of said water bath being at least 5 inches and the temperature of said water bath being below about 55° F.;

c) passing the extruded tube axially through an air ring disposed in said air gap; and d) enhancing the transverse direction tensile strength of said seamless cellulose tubular film by cooling said extruded tube in said air gap with a stream of cooling air flowing downwardly from said air ring, said stream of cooling air being radially spaced from and extending around the outer surface of said extruded tube so as to form an air stream that flows parallel to the surface of the extruded tube.

8. A method as in claim 7 wherein said air gap is 5 to 10 inches long, said draw ratio is in the range of 4 to 8 and the temperature of said water bath is between 35° F. and 55° F.

9. A method as in claim 7 wherein said stream of cooling air is produced by a vortex tube connected to a source of pressurized air, said vortex tube having a cool air outlet at one end connected to said air ring in said air gap and a warm air outlet at an opposite end thereof.

10. A method as in claim 7 wherein said draw ratio is greater than 7.

11. A method for forming a seamless cellulose tubular film suitable for use as a food casing from a solution composed of cellulose, a tertiary amine N-oxide cellulose solvent and water, said method comprising extruding said solution as a tube from an annular die orifice through an air gap of greater than five inches and into a bath of nonsolvent liquid held at a temperature of about 35° F. to about 55° F., and, in said air gap, exposing said tube to a cooling air flow for cooling said tube prior to entering said bath.

12. A method as in claim 11 wherein exposing said tube to a cooling air flow in said air gap is accomplished by directing an air flow generally parallel to and radially spaced from the outer surface of said tube.

13. A method as in claim 12 further comprising initiating said air flow from an air ring located in said air gap, and passing said tube through said air ring.

14. A method as in claim 13 wherein the temperature of the air issuing from said air ring is about 40° F.

15. A method as in claim 11 wherein said air gap is five to ten inches long and the temperature of said nonsolvent liquid bath is not greater than about 55° F.

16. Apparatus for extruding a tubular film suitable for use as a food casing comprising:

a) an extrusion die having an annular orifice oriented for the downward extrusion of a tube composed of a heated solution of cellulose, tertiary amine N-oxide cellulose solvent and water;

b) a bath of nonsolvent liquid disposed beneath said extrusion die for receiving a tube extruded from said orifice, the surface of said bath and said annular orifice defining an air gap therebetween of about five to ten inches;

c) means for maintaining said bath at a temperature below 65° F.;

d) a mandrel depending from said extrusion die such that it is disposed within a tube extruded from said orifice, said mandrel having a lower end disposed below the surface of said bath; and e) means for exposing an extruded tube in said air gap to a cooling air flow, said means including an air ring having an annulus to accommodate the passage of said extruded tube, said air ring having a plurality of openings for discharging cooling air in streams which flow downwardly generally parallel to the surface of said tube.

17. Apparatus as set forth in claim 16 including a vortex tube communicating with a source of air under pressure, said vortex tube having a cool air outlet connected to said air ring and a heated air outlet.

* * * * *